(12) United States Patent
Drivstuen et al.

(10) Patent No.: US 10,010,229 B2
(45) Date of Patent: Jul. 3, 2018

(54) HOSE VALVE APPARATUS AND METHOD FOR RETRACTABLE HOSE VACUUM SYSTEMS

(71) Applicants: Rod Drivstuen, Monroe, WA (US); Robert Lee Rawls, Woodinville, WA (US)

(72) Inventors: Rod Drivstuen, Monroe, WA (US); Robert Lee Rawls, Woodinville, WA (US)

(*) Notice: Subject to any disclaimer, the term of this patent is extended or adjusted under 35 U.S.C. 154(b) by 0 days.

(21) Appl. No.: 15/286,431

(22) Filed: Oct. 5, 2016

(65) Prior Publication Data

US 2017/0127897 A1 May 11, 2017

Related U.S. Application Data

(60) Provisional application No. 62/238,058, filed on Oct. 6, 2015.

(51) Int. Cl.
*A47L 9/24* (2006.01)
*A47L 5/38* (2006.01)
*B23P 19/04* (2006.01)

(52) U.S. Cl.
CPC ............ *A47L 9/244* (2013.01); *A47L 5/38* (2013.01); *B23P 19/04* (2013.01)

(58) Field of Classification Search
CPC .......... A47L 9/244; A47L 5/38; A47L 9/2894; A47L 9/0063; A47L 5/365; A47L 9/2857; B23P 19/04; F28G 3/166; F28G 3/163
See application file for complete search history.

(56) References Cited

U.S. PATENT DOCUMENTS

| 4,634,197 | A | 1/1987 | Horlacher, Jr. |
| 4,664,457 | A | 5/1987 | Suchy |
| 4,846,712 | A | 7/1989 | Holden et al. |
| 4,894,020 | A | 1/1990 | Holden et al. |
| 4,895,528 | A | 1/1990 | Choiniere et al. |
| 5,069,635 | A | 12/1991 | Holden et al. |
| 5,430,978 | A | 7/1995 | Kohler |
| 5,526,842 | A | 6/1996 | Christensen |

(Continued)

*Primary Examiner* — Dung Van Nguyen
(74) *Attorney, Agent, or Firm* — William Forster

(57) ABSTRACT

A hose valve for central vacuum cleaning systems having retractable suction hoses that retract into a system vacuum pipe. The hose valve comprises a valve box, a chamber connection port, and a system pipe connection port arranged to securely engage the chamber connection port. A locking assembly is radially disposed about a locking assembly axis between the chamber connection port and the system pipe connection port. The locking assembly comprises a coaxially disposed compression cylinder having a radially outer cylinder surface arranged to define symmetrically disposed helical grooves. A cylindrical deformable sleeve is coaxially disposed adjacent the compression cylinder and is radially inwardly deformable responsive to an axial compressive force. A thrust ring is disposed adjacent the chamber connection port and defines a radially inner surface having opposing inner post groove followers arranged to engage the helical grooves of the compression cylinder to urge the compression cylinder axially toward the system pipe connection port to compress the deformable sleeve to form a seal around a vacuum suction hose.

20 Claims, 10 Drawing Sheets

(56) References Cited

U.S. PATENT DOCUMENTS

| | | |
|---|---|---|
| 5,578,795 A | 11/1996 | Ward |
| 5,740,581 A | 4/1998 | Harrelson, II |
| 5,740,582 A | 4/1998 | Harrelson, II |
| 6,143,996 A | 11/2000 | Skanda |
| 6,158,080 A | 12/2000 | Schiapkohl |
| 6,182,327 B1 * | 2/2001 | Gosselin .................. A47L 5/38 137/355.16 |
| 7,010,829 B2 | 6/2006 | Harman et al. |
| 7,226,302 B2 | 6/2007 | Walter et al. |
| 8,479,353 B2 | 7/2013 | Drivstuen et al. |
| 9,717,381 B2 * | 8/2017 | Harman .................... A47L 5/38 |
| 2001/0022009 A1 | 9/2001 | Spearman |
| 2002/0069477 A1 | 6/2002 | Smith |
| 2005/0183228 A1 | 8/2005 | Snyder |
| 2007/0174991 A1 | 8/2007 | Trotter |
| 2010/0024152 A1 * | 2/2010 | Drivstuen ................ A47L 5/38 15/314 |
| 2015/0190023 A1 * | 7/2015 | Nieschwitz ........... A47L 9/0009 15/315 |
| 2016/0367095 A1 * | 12/2016 | Bruneau ................ A47L 9/242 |

\* cited by examiner

HOSE VALVE APPARATUS AND METHOD FOR RETRACTABLE HOSE VACUUM SYSTEMS

This application claims the benefit of U.S. Provisional Application No. 62/238,058

BACKGROUND

This invention relates generally to central vacuum cleaning systems, and more particularly to central vacuum cleaning systems comprising retractable suction hoses that retract through a hose valve, into a system vacuum pipe.

Central vacuum cleaning systems are well known and have been available for many years. One early design is U.S. Pat. No. 3,593,363 issued in 1972 disclosing a central vacuum cleaning system using a retractable hose. The inserted end of the hose has a compressible annular seal. The hose is pulled out of the suction conduit located in a wall or floor until the foot end or inserted end reaches the receptacle mounted on the floor or wall, at which time the annular seal on the hose engages a corresponding annular abutment at the receptacle to hold the hose in position and seal between the hose and the receptacle. Accordingly, this design requires that the full length of the hose be pulled out prior to the user using the vacuum.

In 1987, U.S. Pat. No. 4,688,596 issued disclosing a wall outlet box for a control vacuum system that connects to a vacuum hose. The '596 design does not provide any hose storage, or retractable hose features.

In 1990, U.S. Pat. No. 4,895,528 issued disclosing a hose-to-wall fitting for a central vacuum system. Like the earlier '596 reference, the features of the '528 patent were directed to a hose connection fitting only.

Later, in 1996, U.S. Pat. No. 5,526,842 issued to Christensen disclosing a motorized hose wind-up mechanism that requires a somewhat complicated and expensive mechanism for the operation thereof.

In 2013, U.S. Pat. No. 8,479,353 issued to Drivstuen et al disclosing a retractable hose vacuum system that employed a valve box having a rather large door that incorporated a seal around the entire outside perimeter. This design required a large valve box that was difficult to adapt to installations with widely varying wall thicknesses.

While most of the above noted central vacuum system designs include features that are useful in the task to perform the debris vacuum removal process, they typically do not provide a simple, quick way of deploying a long vacuum hose to a selected length through a compact valve box. In addition, these designs do not address the problems associated with installations where the wall thickness outside the wall studs very from as little as ½ inch to as much as 1.5 inches.

Accordingly, a need remains for a compact hose valve, for a central vacuum cleaning system, that can fit in small spaces and is easily adaptable to accommodate widely varying wall thicknesses.

SUMMARY OF THE INVENTION

One object of the present invention is to install valve boxes into walls that comprise thicker than normal wall surfaces that extend outward from the wall studs.

A second object is to reduce the size of valve boxes used in vacuum hose systems.

Another object is to reduce the size of a sealing element to prevent the flow of air in to a valve box.

Yet another object is to isolate the opening/aperture required by a locking arm.

A further object is to stabilize and maintain a deployed vacuum hose that moves responsive to the vacuum created by a central vacuum system.

Still another object is to maintain the air seal around a vacuum hose designed to retract in a vacuum system pipe.

An additional object is to allow the user to select the desired length of vacuum hose needed to perform the vacuum process.

Another object is to arrange a valve box to accommodate hosed having a male end nozzle fitting.

The invention is a hose valve for central vacuum cleaning systems that employ a retractable suction hose, of the type that retracts into a system vacuum pipe. The hose valve comprises a valve box formed to define a nozzle storage chamber, and a chamber connection port that is in communication with the nozzle storage chamber. A locking assembly is secured to the valve box. The locking assembly defines a passage for receiving and guiding a retractable suction hose, that extends through the nozzle storage chamber, and through the locking assembly and chamber connection port.

More specifically, in the present invention, the valve box is formed to define a nozzle storage chamber, and a chamber connection port arranged and disposed for communication with the nozzle storage chamber, the valve box further comprises an exterior face-plate having a hose receiving aperture arranged for sealed communication with the nozzle storage chamber. Further, the exterior face-plate is formed to define a planar mounting flange disposed for securing the valve box to a fixed structure which is commonly a mounting assembly attached to a wall stud. The face plate further comprises a locking arm aperture that is disposed in spaced relation to the hose receiving aperture.

Importantly, a unique feature in the present invention includes a locking assembly radially disposed about a locking assembly axis that is offset as described below. The locking assembly being secured, in part, to the valve box chamber connection port, wherein the locking assembly defines a passage for receiving and guiding a retractable suction hose having a male end nozzle that is extendable through the locking assembly, the nozzle storage chamber and through hose receiving aperture of the face plate. As noted above, the locking assembly axis is offset at an angle to the plane of the face plate, and to the planer mounting flange. Although the offset angle in the present invention is approximately 34 degrees, it should be noted that even a small offset angle would, to some extent, provide the same advantages but to a less extent.

As noted above, the present invention includes some features found in earlier issued patents including a locking assembly more fully described in the description.

Another feature of the present invention includes a hose valve further comprising a sealing door attached to the exterior face plate, wherein the sealing door is movable from a first open position to a second closed position adjacent the exterior face plate. Importantly, the sealing door defines an interior surface configured to receive and secure a flexible seal shaped to seal the hose receiving aperture when the door is in the second closed position. In this way, a compact and efficient seal of the hose receiving aperture is created without having to seal the entire face plate or the locking arm aperture.

An additional feature of the present invention is an arcuate transition pipe having a fixed end extending from a portion of the valve box, about the locking assembly axis, extending to a connecting end radially disposed about a system vacuum pipe axis. Notably, the system vacuum pipe axis is substantially parallel to the plane defined by the planar mounting flange of the exterior face plate. In this way, the hose valve extends easily into a wall cavity for connection to a system vacuum pipe as will be described in more detail below.

The foregoing and other objects, features, and advantages of this invention will become more readily apparent from the following detailed description of a preferred embodiment which proceeds with reference to the accompanying drawings, wherein the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention.

DETAILED DESCRIPTION OF PREFERRED EMBODIMENT

Figure 1:
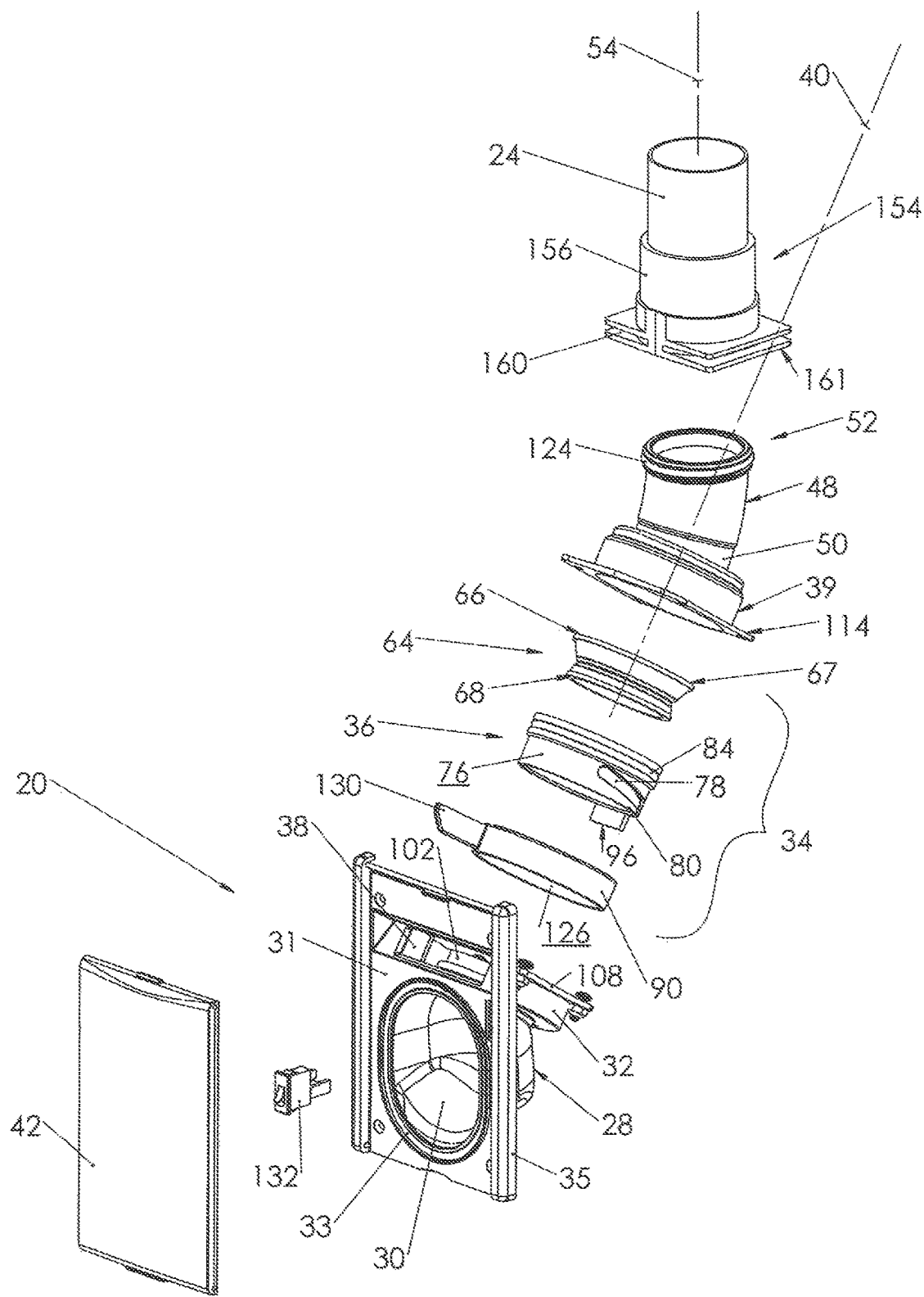
FIG. 1 is a front side exploded perspective view of a valve box, locking assembly, a sealing door separated from the valve box, and a transition pipe extending to a slide fitting receiving a system vacuum pipe.
Figure 2:
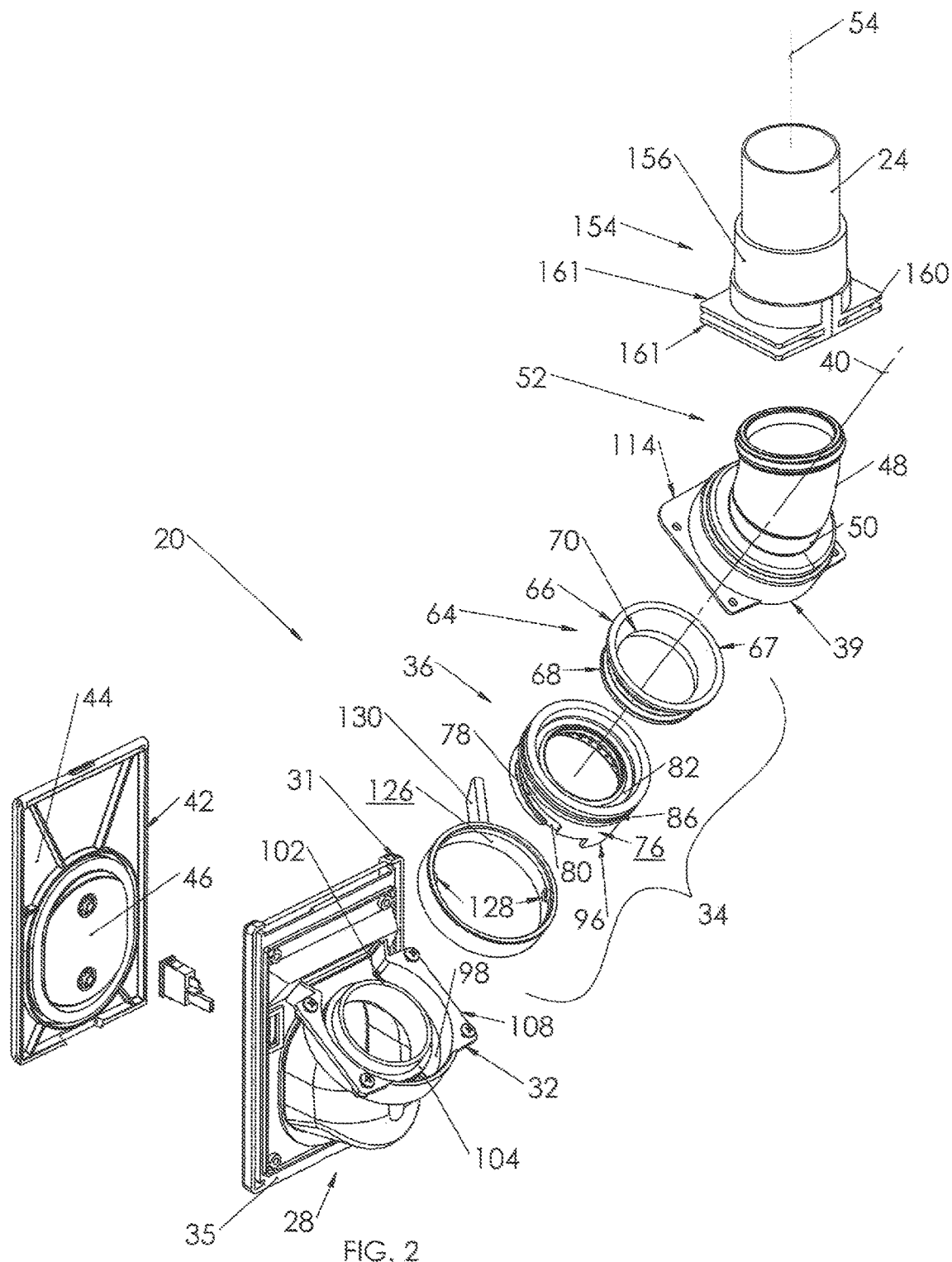
FIG. 2 is a rear side exploded perspective view of a valve box, locking assembly, a sealing door separated from the valve box, and a transition pipe extending to a slide fitting receiving a system vacuum pipe.
Figure 3:
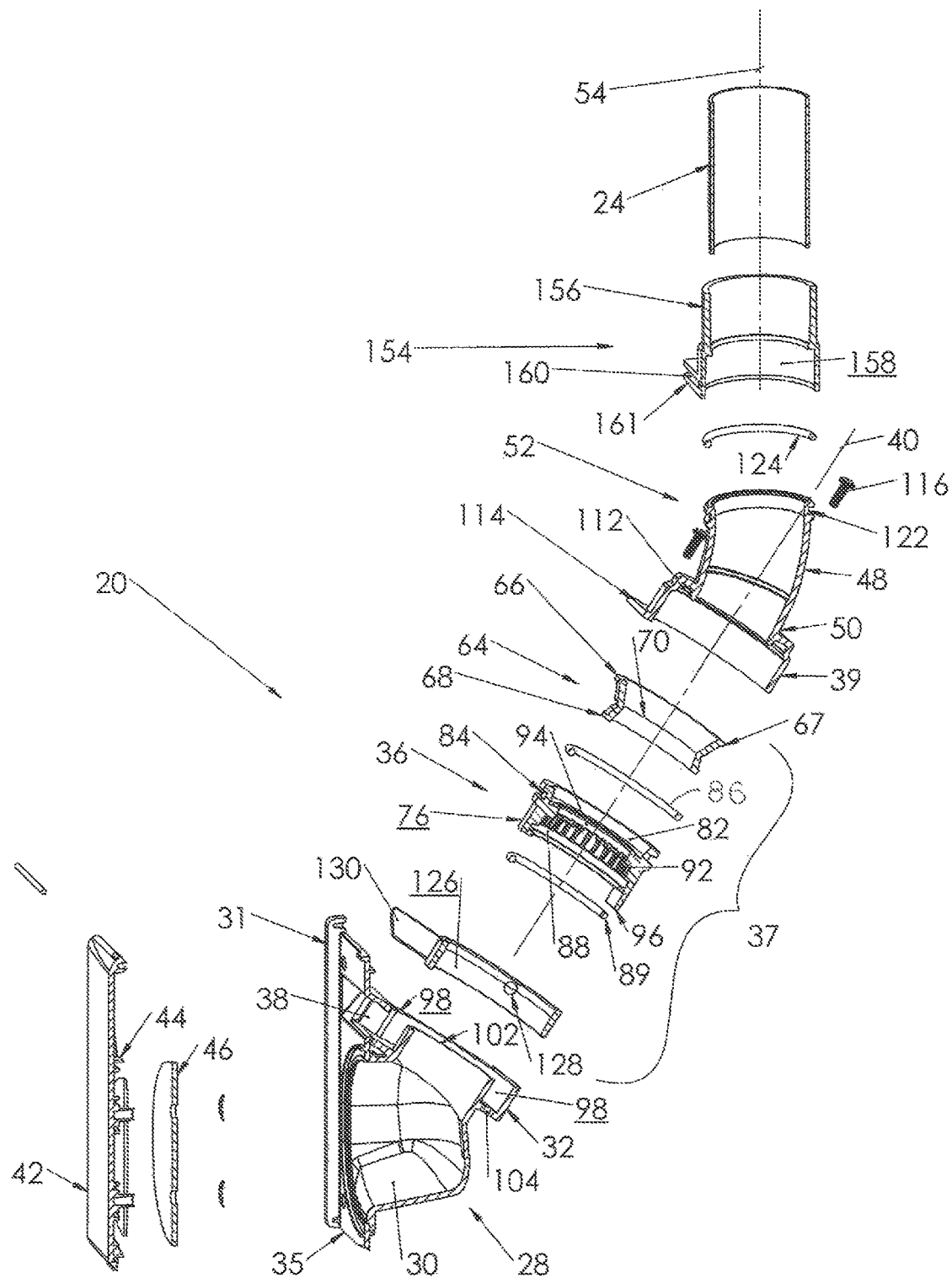
FIG. 3 is a rear side exploded, cross-sectional perspective view of a valve box, locking assembly, a sealing door separated from the valve box with a flexible seal separated from the sealing door, and a transition pipe extending to a slide fitting receiving a system vacuum pipe.
Figure 4:
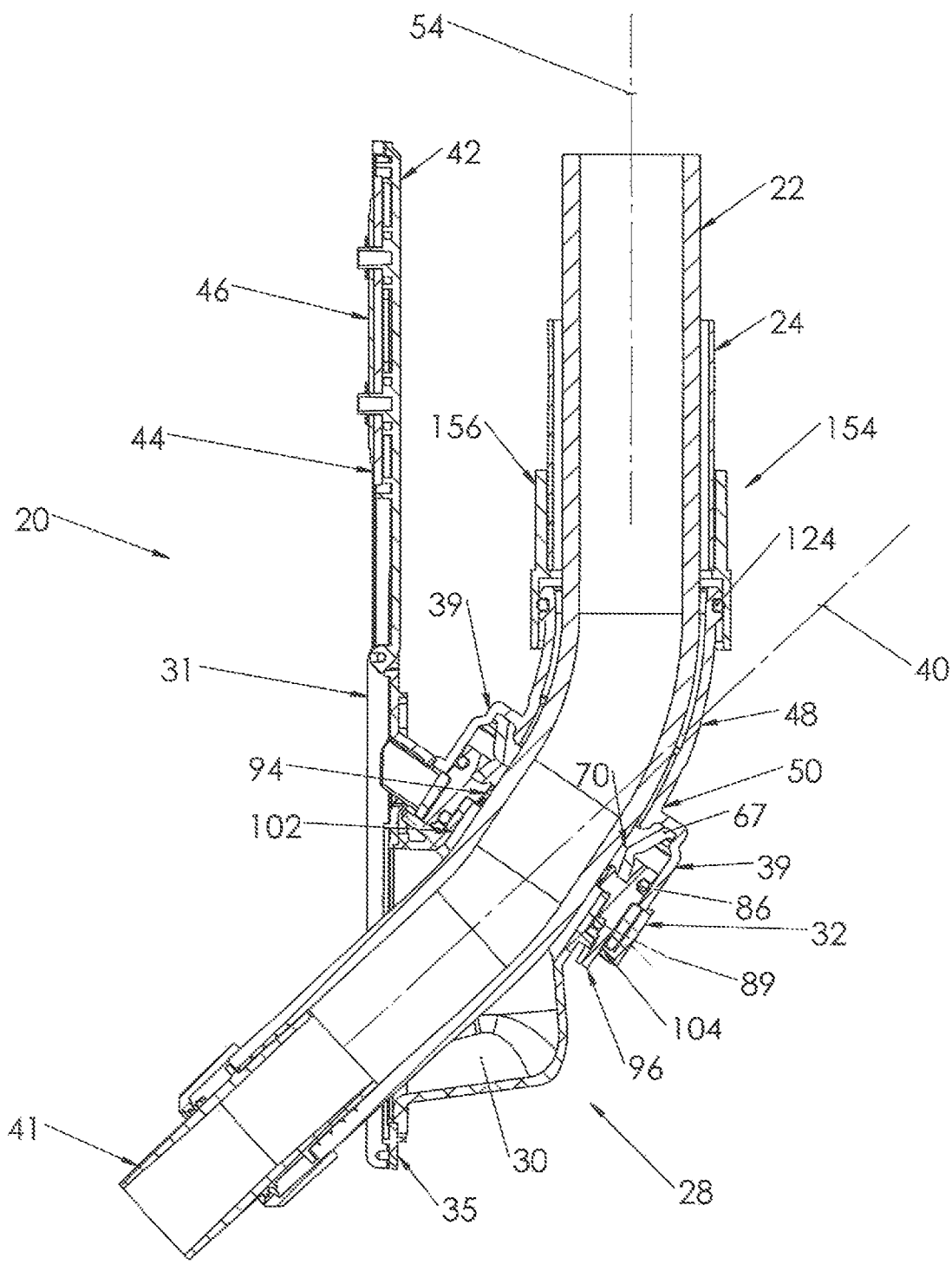
FIG. 4 is a cross-sectional view of a suction hose with a male end shown extending through a hose valve.
Figure 5:
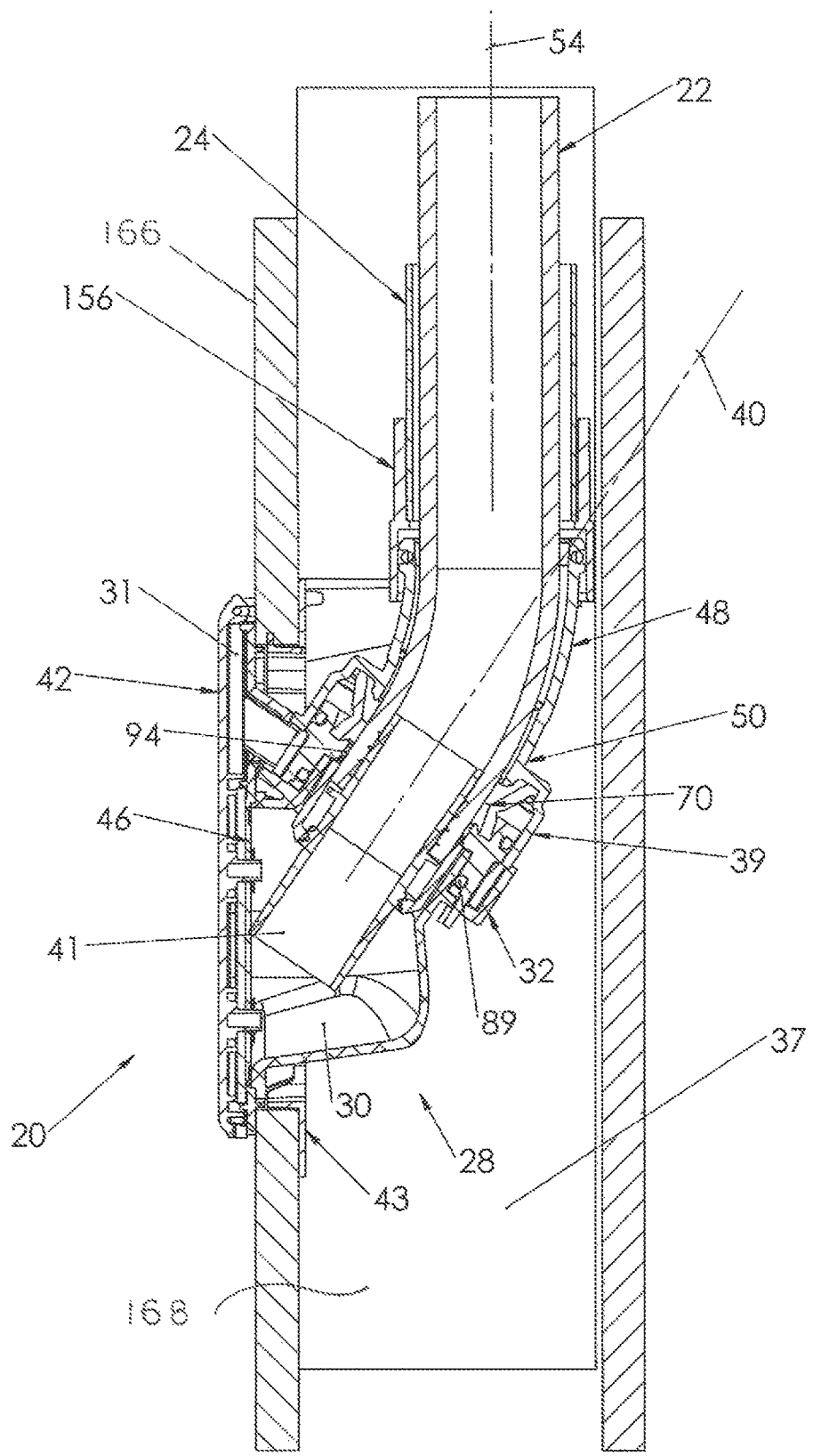
FIG. 5 is a cross-sectional view of a hose valve positioned within a wall cavity wherein the exterior wall material is approximately 0.5 inches thick.
Figure 6:
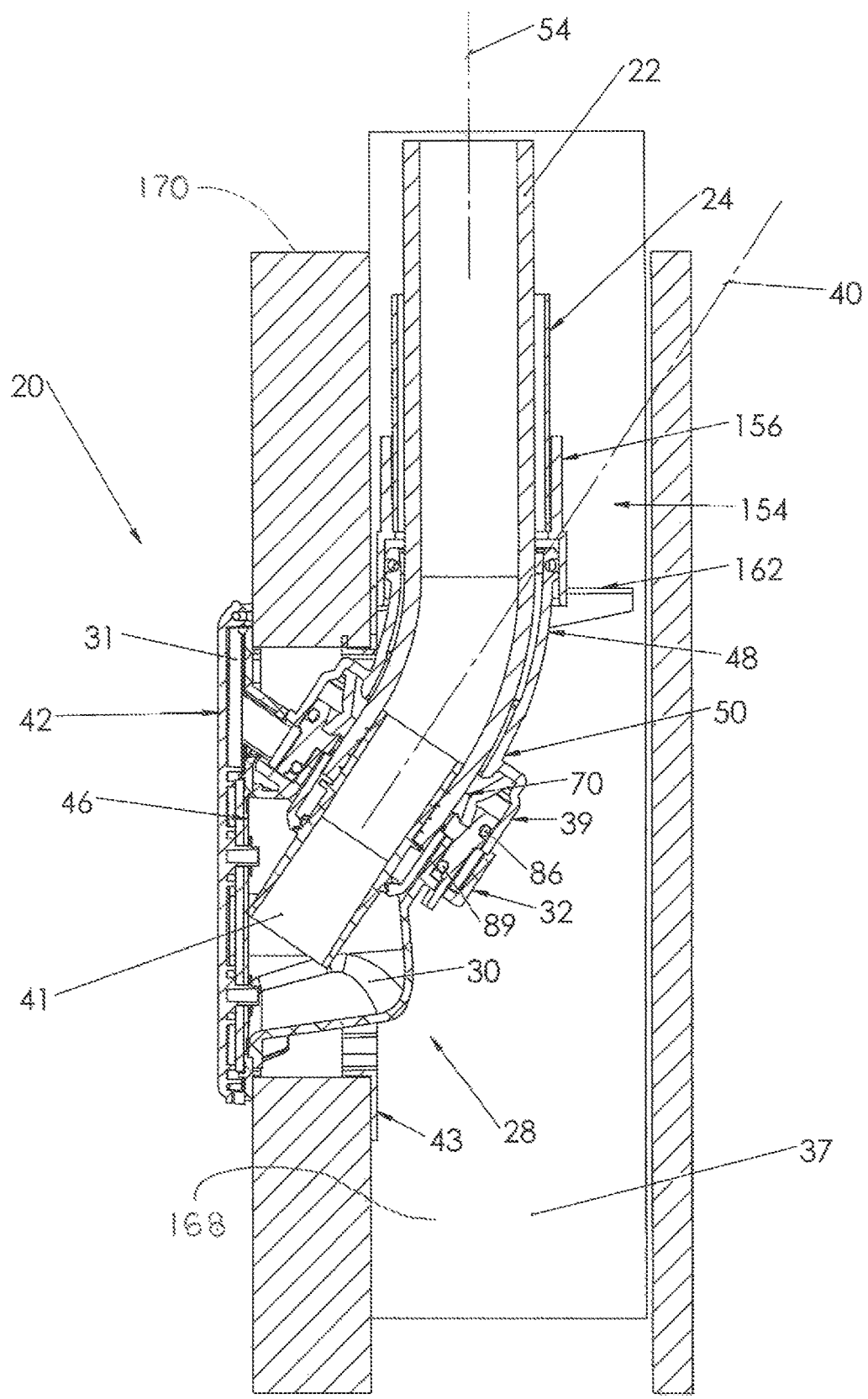
FIG. 6 is a cross-sectional view of a hose valve positioned within a wall cavity wherein the exterior wall material is approximately 1.5 inches thick, the view also illustrating a suction hose having a male end with a cuff positioned to prevent the suction hose from traveling back through the hose valve.
Figure 7:
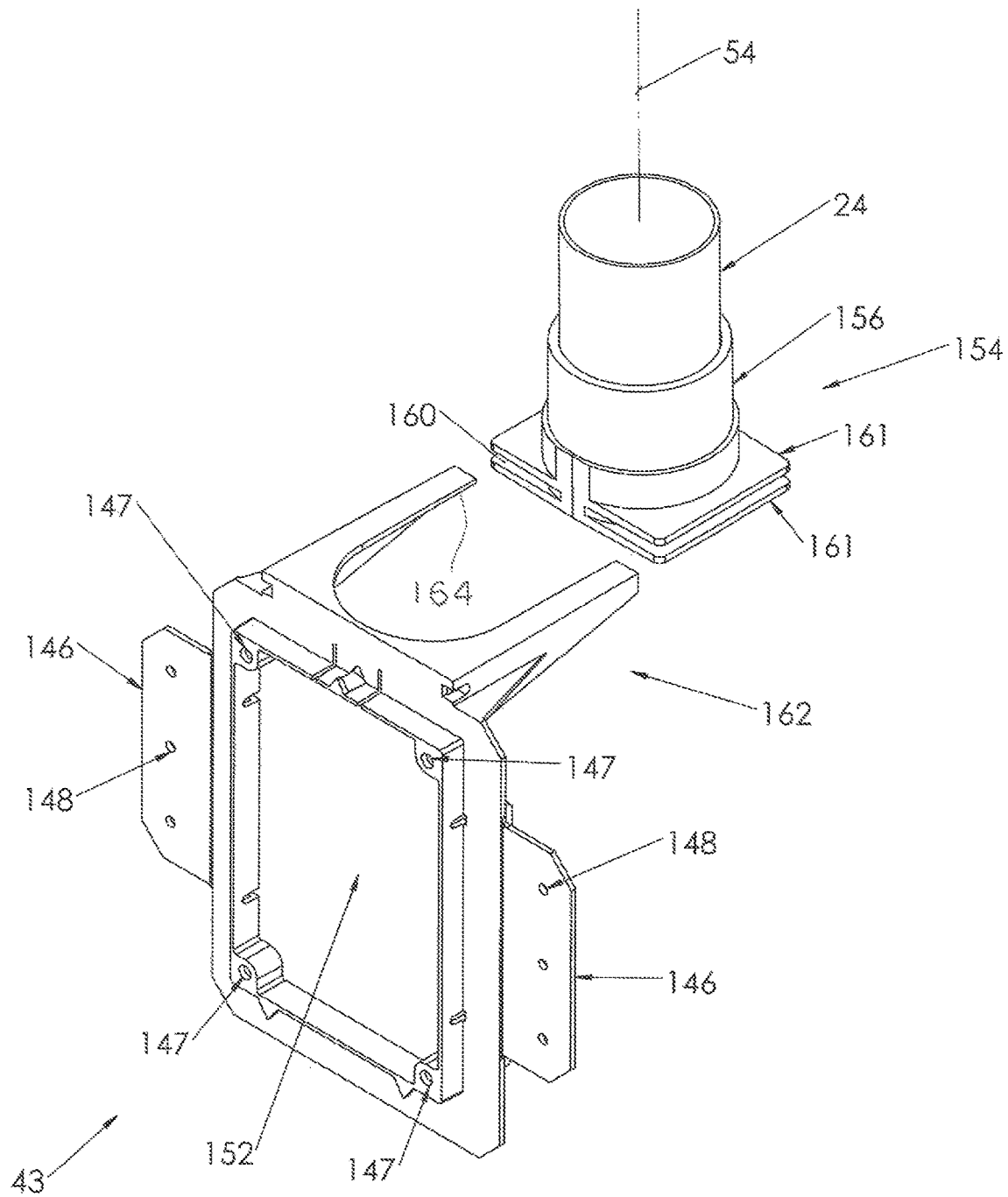
FIG. 7 is front perspective exploded view illustrating a mounting assembly separated from a slide fitting and system vacuum pipe.

FIGS. 1 through 8 show an embodiment of hose valve 20 for central vacuum cleaning systems (not illustrated) that employ a retractable suction hose 22, as illustrated in FIGS. 4 through 6, of the type that retracts into a system vacuum pipe 24. The hose valve 20 comprises a valve box 28 formed to define an nozzle storage chamber 30, and a chamber connection port 32 that is in sealed communication with the nozzle storage chamber 30 and secured to the valve box 28. Additionally, a locking assembly 34 is secured within the hose valve 20, between the valve box 28 and a system pipe connection port 39. The locking assembly 34 defines a passage for receiving and guiding a retractable suction hose 22 that extends through the nozzle storage chamber 30, and through the locking assembly 34 and through the system pipe connection port 39.

It should be noted that the present invention incorporates many of the features of a valve locking mechanism illustrated and described in U.S. Pat. No. 8,479,353 issued to Drivstuen et al in 2013. Accordingly, for the purpose of expediency and to avoid redundancy, U.S. Pat. No. 8,479,353 is hereby incorporated by reference. For this purpose, the focus will be primarily on new features described and illustrated in the following, wherein only the major components of the improved hose valve 20, in the present invention, will be disclosed in depth.

Figure 8:
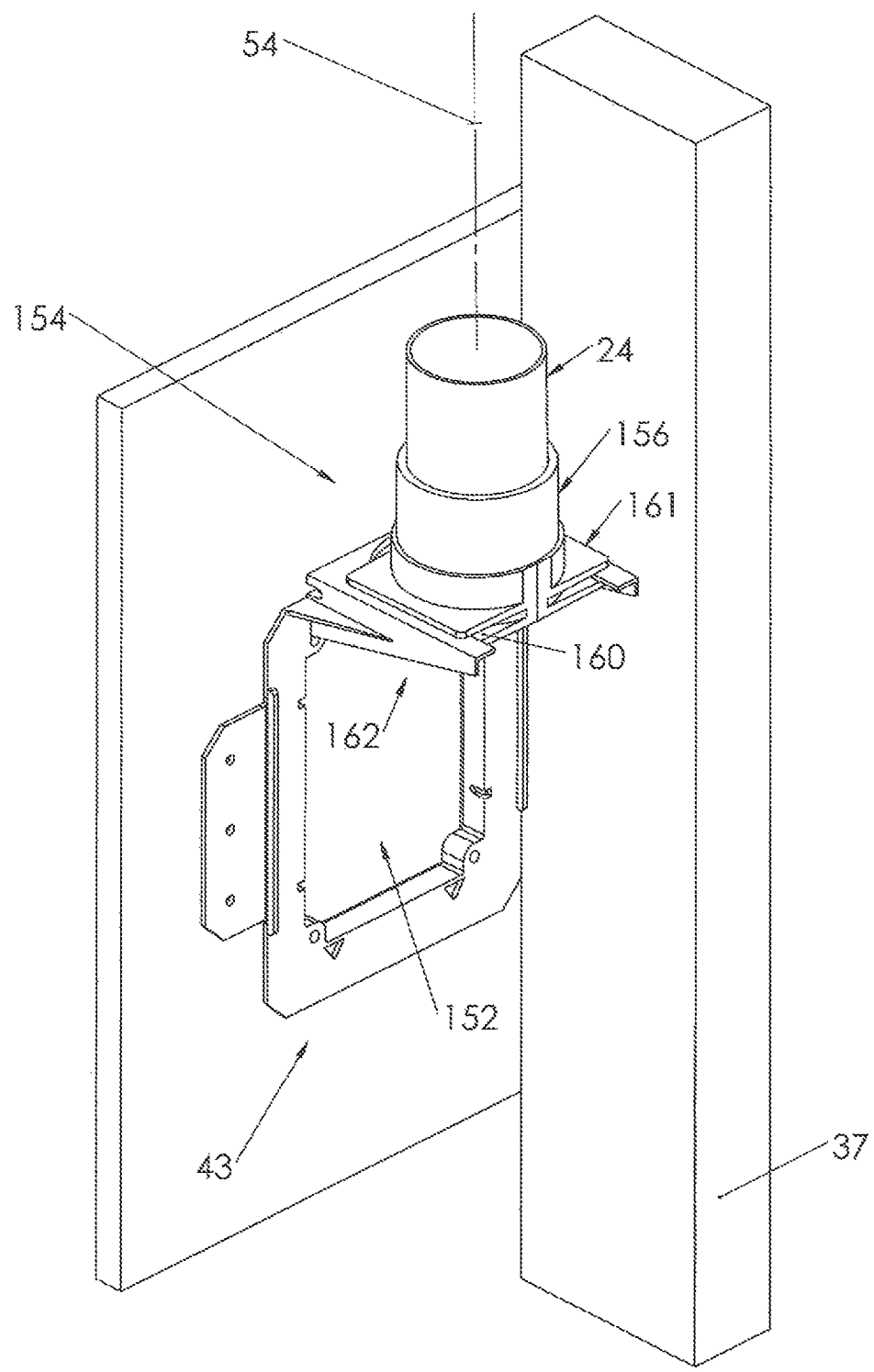
FIG. 8 is a rear perspective view of a mounting assembly with a slide fitting and system vacuum pipe wherein the mounting assembly is positioned within a wall cavity covered with a 1.5 inch thick wall material.

More specifically, in the present invention, the valve box 28 is formed to define a nozzle storage chamber 30 disposed adjacent the chamber connection port 32 The chamber connection port 32 is arranged for communication with the nozzle storage chamber 30, the valve box 28 further comprises a planar exterior face-plate 31 having a hose receiving aperture 33 arranged for sealed communication with the nozzle storage chamber 30. Further, the exterior face-plate 31 is formed to define a planar mounting flange 35 disposed for securing the valve box 28 to a fixed structure which is commonly a wall stud 37 or a mounting assembly 43 as illustrated in FIGS. 5, 6 & 8. The exterior face plate 31 further comprises a locking arm opening 38 that is disposed in spaced relation to the hose receiving aperture 33.

Importantly, a unique feature in the present invention includes a locking assembly 34 radially disposed about a locking assembly axis 40 that is offset as described below. The locking assembly 34 being secured to the valve box 28 via the chamber connection port 32, wherein the locking assembly defines a passage for receiving and guiding a retractable suction hose 22 having a male end nozzle 41 that is extendable through the locking assembly 34, the nozzle storage chamber 30 and through hose receiving aperture 33 of the exterior face plate 31. As noted above, the locking assembly axis 40 is offset at an angle to the plane of the exterior face plate 31, and to the planer mounting flange 35. In this way, the male end nozzle 41 can be easily stored in the valve box and pulled through the same. In addition, as will be see in the following, the offset locking assembly axis 40 allows for ease of installation of the hose valve 20 into a wall cavity. Although the offset angle in the present invention is approximately 34 degrees, it should be noted that even a small offset angle would, to some extent, provide similar advantages.

Another feature of the present invention includes a hose valve 20 further comprising a sealing door 42 attached to the exterior face plate 31, wherein the sealing door 42 is movable from a first open position to a second closed position adjacent the exterior face plate 31. Importantly, the sealing door 42 defines an interior surface structure 44 configured to receive and secure a flexible seal 46 shaped to seal the hose receiving aperture 33 when the sealing door 42 is in the second closed position. In this way, a compact and efficient seal of the hose receiving aperture 33 is created without having to seal the entire valve box 28 or the locking arm opening 38.

An additional feature of the present invention is an arcuate transition pipe 48 having a fixed end 50 extending from the system pipe connection port 39 to a connecting end 52 radially disposed about a system vacuum pipe axis 54. Notably, the system vacuum pipe axis 54 is substantially parallel to the plane defined by the planar mounting flange 35 of the exterior face plate 31. In this way, the hose valve 20 extends easily into a wall cavity for connection to a system vacuum pipe 24 as will be described in more detail below.

Considering now in more detail, portions of the locking assembly 34 in the present invention are similar to the locking assembly in the '353 patent noted earlier. However, the locking assembly 34 in the present invention includes novel features and improvements over that found in the '353 reference. As noted above, the valve assembly 34 is disposed about a locking system axis 40 that is slanted approximately 34 degrees from the plane defined by the exterior face plate 31 and its planar mounting flange 35. Similarly, the locking system axis 40 is inclined from the wall structure supporting the hose valve 20 by greater than a minimum of 20 degrees. This configuration enables the user to more easily pull the suction hose 22 from the valve box 28.

Additionally, like the '353 reference, the locking assembly 34 includes a deformable sleeve 64, however this sleeve is much more compact and includes an upper compression end 66 shaped to define a small flange 67, a lower compression end 68, and an inner sleeve ridge 70. With this construction, the present invention deformable sleeve 64 operates and compresses in a similar manner as in the "353 reference.

The other parts included to compress the deformable sleeve 64 are quite different from those found in the '353 reference. For example, the present invention locking assembly 34 includes a compression cylinder 36 having a radially outer surface 76. The radially outer surface 76 is formed to define opposing symmetrically disposed upwardly spiraling helical grooves 78 with each groove having an entry passage 80. Further, the compression cylinder 36 comprises a radially disposed circular interior sleeve seat 82 radially disposed for receiving the lower compression end 68 of deformable sleeve 64.

In order to seal the locking assembly 34, within the hose valve 20, the compression cylinder 36 includes a radially outer o-ring groove 84 for receiving an O-ring 86, and a radially inner o-ring groove 88 to receive an O-ring 89. Also included adjacent the radially inner O-ring groove 88 is a radially inner step 92 defined by a plurality of notches or vanes formed in the manufacturing process to form a nozzle seat 94 to prevent the male end nozzle 41 from extending inward past the locking assembly 34. Finally, the compression cylinder 36 includes a rear extension key 96 that engages with the chamber connection port 32 to prevent relative rotation.

Considering now other components of the hose valve 20, a chamber connection port 32 defines a circular ring seat surface 98 disposed about the locking assembly axis 49 to receive a thrust ring 90 as more fully described in the following. Also included is an interior cylindrical sealing lip 102 disposed about the locking assembly axis 40, a rear key slot 104, to receive the rear extension key 96, a locking arm opening 38, and a connection flange 108.

Opposing the chamber connection port 32 is a system pipe connection port 39 having a radially disposed circular upper sleeve seat 112 disposed about the locking assembly axis 40 to receive the upper compression end 66 and flange 67 of the deformable sleeve 64. Also, as seen in FIG. 3, a cylindrical interior surface 113, of the system pipe connection port 39, is employed to sealingly engage o-ring 86 disposed in radially outer o-ring groove 84.

Similar to the chamber connection port 32, the system pipe connection port 39 includes a connection flange 114 to mate the same together and fasten together with fasteners 116 as illustrated in FIG. 3. As part of the system pipe connection port 39, a arcuate transition pipe 48 is included to transition from the locking assembly axis 40 to the system vacuum pipe axis 54 which, in most installations, is vertical. It should be noted that adjacent the outer end 120 of the transition pipe 48 is an outer O-ring groove 122 formed to receive an O-ring 124 to create a seal between the system pipe connection port 39 and the system vacuum pipe 24.

Figure 9:
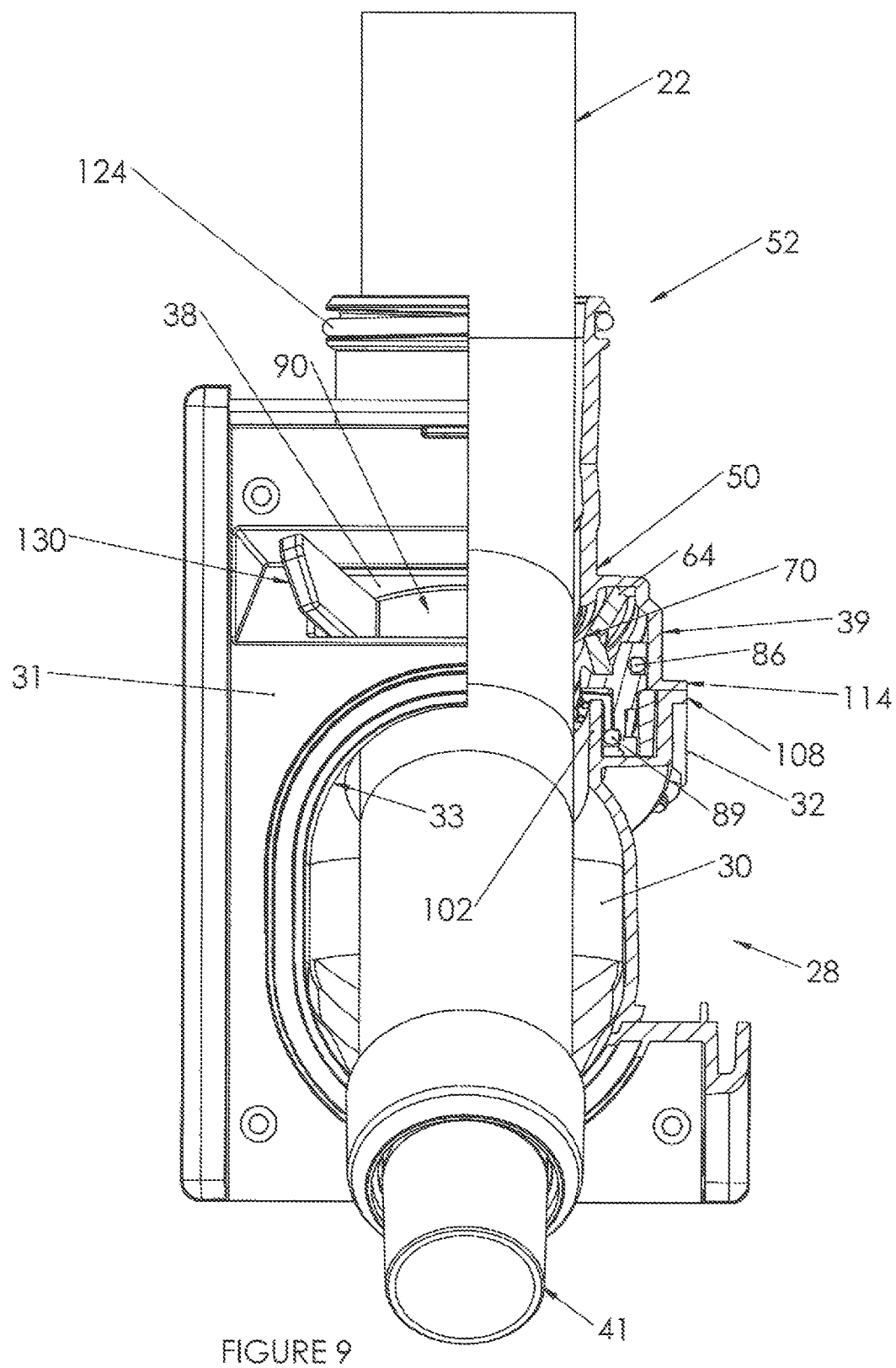
FIG. 9 is an elevation view looking directly into the valve box, with the door removed so that the view shows a non-exploded valve box that includes the curved transition piece without a valve pipe connection piece. The valve box has portions cut-away to expose the compression cylinder in the first, unlocked position where the deformable sleeve is in the uncompressed position, with the locking arm in the leftward, unlocked position.
Figure 10:
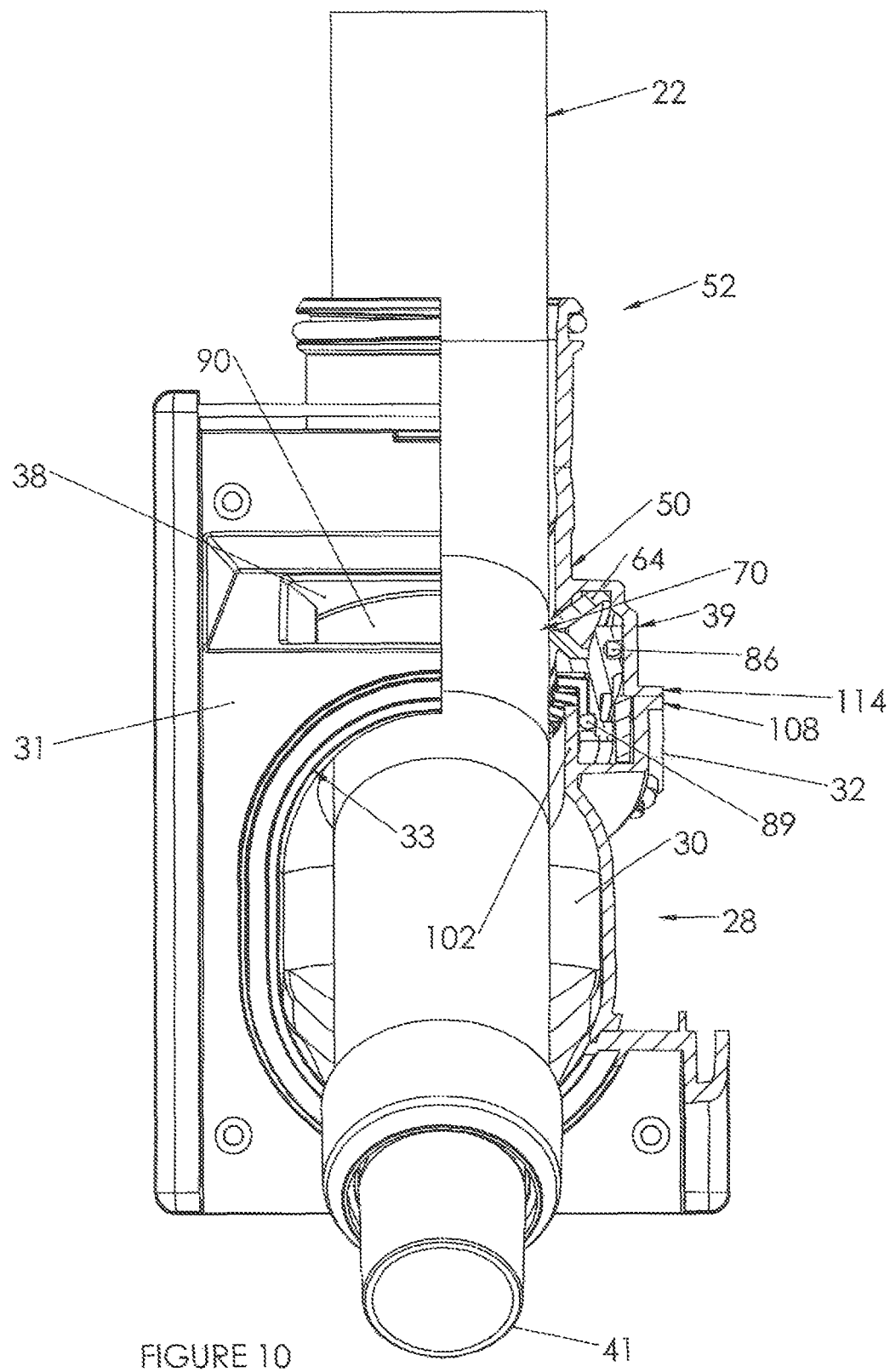
FIG. 10 is similar to FIG. 9 except the cut-away portions show the compression cylinder in the second, locked position where the deformable sleeve is in the compressed position, in this illustration it should be noted that the locking arm would be in the rightward, locked position but cannot be seen because it is part of the cut-away portion.

Finally, the locking assembly 34 includes a thrust ring 90 having a radially inner surface 126, and a pair of inner post groove followers 128 formed thereon as best illustrated in FIGS. 2 and 3. The inner post groove followers 128 are symmetrically disposed approximately 180 degrees apart and are provided to engage the helical grooves 78 of the compression cylinder 36. In this way, a locking arm 130, fixed to the thrust ring 90 can be used to move the thrust ring 90 from a first position (FIG. 9) where the deformable sleeve 64 is uncompressed, to a second position (FIG. 10) where the inner post groove followers 128 move along the helical grooves 78 to move the compression cylinder 36, along the locking assembly axis 40, against the deformable sleeve 64 to compress or inwardly collapse the same and lock the inner sleeve ridge 70 against the suction hose 22.

Considering now, other features of a hose valve 20, the valve box 28 is constructed to receive a common electrical rocker switch assembly, i.e., valve actuator switch 132 provided to electrically turn the vacuum system on and off. Importantly, the valve actuator switch 132 is secured outside of the hose receiving aperture 33. In this way the nozzle storage chamber 30 can be sealed by a small flexible seal 46 sized to only cover and seal the hose receiving aperture 33. In addition, the valve actuator switch 132 is designed to operate manually as well as automatically when the sealing door 42 is moved to the closed, sealing position.

Directing attention now to FIGS. 5 through 8, a mounting assembly 43 is illustrated. The mounting assembly 43 is provided to secure the valve box 28 to a surface or wall stud 37. For this purpose, the mounting assembly 43 includes a mounting plate 145 having opposing mounting flanges 146. Each mounting flange 146 includes a plurality of mounting holes 148 for nailing or screwing the mounting assembly 43 to a wall stud. In addition, the mounting assembly plate 145 defines an opening 152 sized to receive a valve box 28 through the same. To secure the valve box 28 to the mounting plate 145, a plurality of threaded bores 147 are incorporated in the mounting plate 145.

Finally, to provide a sealed connection between the system pipe connection port 39 of hose valve 20, and the system vacuum pipe 24, a movable slide fitting 154 is employed. The slide fitting 154 comprises a receiving neck 156, arranged to receive a system vacuum pipe 24, and an interior sealing surface 158 arranged to sealingly receive the connecting end 52 of the transition pipe 48 and its o-ring 124.

In addition, the slide fitting 154 includes a slot 160 The slot 160 is formed between two spaced square plates adapted to receive two opposing elongate receiving arms 162 formed in the mounting plate 145. The receiving arms 162 define opposing edges 164 that fit into slot 160. Accordingly, the slot 160 accommodates lateral movement between the mounting assembly 43 and the slide fitting 154. This, in turn, allows for movement to adjust the position of the hose valve 20 in relation to the mounting plate 145. It is this feature that allows hose valve 20 to adapt and accommodate varying thicknesses of wall surfaces during the installation process. For example, if a thin wall 166 is encountered, the hose valve 20 would extend further into the wall cavity 168 created by the wall stud. Similarly, if a thick wall 170 is encountered, the hose valve 20 would be positioned forward in the wall cavity 168 via slide fitting 154.

In the drawings and specifications there have been set forth preferred embodiments of the invention and although specific terms are employed, they are used in a generic and descriptive sense only and not for purposes of limitation. The design of the hose valve depicted in this invention combine several functions, that of sealing, restraining and wear reduction, into one device or mechanism. Separate devices or mechanisms could be used for each function. Other devices or mechanisms could be used to achieve the functions and results.

In addition, whereas the drawings and specifications relate to central vacuum cleaning systems for a home or building, the application is not limited to this industry alone but to any industry or operation where a vacuum system is used.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

What is claimed is:

1. A hose valve for central vacuum cleaning systems having retractable suction hoses that retract into a system vacuum pipe, the hose valve comprising:
   a valve box formed to define a nozzle storage chamber, and a planar exterior face plate having a hose receiving aperture arranged for sealed communication with the nozzle storage chamber, the exterior face plate further comprising a locking arm opening disposed in spaced relation to the hose receiving aperture;
   a chamber connection port arranged and disposed for sealed communication with the nozzle storage chamber, the chamber connection port having an interior cylindrical sealing lip;
   a system pipe connection port arranged to securely engage the chamber connection port, the system pipe connection port defining a cylindrical interior surface and an upper sleeve seat defined by an interior portion of the system pipe connection port;
   a locking assembly radially disposed about a locking assembly axis, wherein the locking assembly is disposed between the chamber connection port and the system pipe connection port, the locking assembly defining a passage for receiving and guiding a retractable hose that is extendable through the locking assembly, into and through the nozzle storage chamber, and through the hose receiving aperture of the planar mounting flange, the locking assembly comprising:
      a coaxially disposed compression cylinder having a radially disposed interior sleeve seat and a radially outer cylinder surface arranged to define symmetrically disposed helical grooves;
      a cylindrical deformable sleeve coaxially disposed adjacent the compression cylinder, the deformable sleeve having a compression end arranged to engage the interior sleeve seat of the compression cylinder, and a flange end formed to engage the upper sleeve seat of the system pipe connection port, the deformable sleeve being radially inwardly deformable responsive to an axial compressive force; and
      a thrust ring disposed adjacent the chamber connection port, the thrust ring defining a radially inner surface having opposing inner post groove followers arranged to engage the helical grooves of the compression cylinder, the thrust ring being rotationally engagable with the compression cylinder so that relative rotation between the compression cylinder and the thrust ring causes the groove followers to move along the helical grooves thereby urging the compression cylinder axially toward the system pipe connection port to compress the deformable sleeve, wherein the thrust ring is rotationally movable about the locking assembly axis from a first unlocked non-compressing position where the deformable sleeve is in its non-deformed condition, to a second locked compressing position where the deformable sleeve is axially compressed to cause deformation with its walls collapsing radially inward to form a seal around a retractable hose disposed through the locking assembly.

2. A hose valve as recited in claim 1 further comprising a sealing door attached to the exterior face plate, the sealing door being movable from a first open position to a second closed position adjacent the exterior face plate, the sealing door having an interior surface configured to receive and secure a flexible seal shaped to seal the hose receiving aperture when the door is in the second closed position.

3. A hose valve as recited in claim 1 wherein the thrust ring comprises a locking arm that extends through the locking arm opening of the exterior face plate.

4. A hose valve for central vacuum cleaning systems having retractable suction hoses that retract into a system vacuum pipe, the hose valve comprising:
   a valve box formed to define a nozzle storage chamber, and a planar exterior face plate having a hose receiving aperture arranged for sealed communication with the nozzle storage chamber, the exterior face plate further comprising a locking arm opening disposed in spaced relation to the hose receiving aperture;
   a chamber connection port arranged and disposed for sealed communication with the nozzle storage chamber, the chamber connection port having an interior cylindrical sealing lip;
   a system pipe connection port arranged to securely engage the chamber connection port, the system pipe connection port defining a cylindrical interior surface and an upper sleeve seat defined by an interior portion of the system pipe connection port;
   a locking assembly radially disposed about a locking assembly axis, wherein the locking assembly is disposed between the chamber connection port and the system pipe connection port, the locking assembly defining a passage for receiving and guiding a retractable hose that is extendable through the locking assembly, into and through the nozzle storage chamber, and through the hose receiving aperture of the planar mounting flange, the locking assembly comprising:
a coaxially disposed compression cylinder having a radially disposed interior sleeve seat and a radially outer cylinder surface arranged to define symmetrically disposed helical grooves;
a cylindrical deformable sleeve coaxially disposed adjacent the compression cylinder, the deformable sleeve having a compression end arranged to engage the interior sleeve seat of the compression cylinder, and a flange end formed to engage the upper sleeve seat of the system pipe connection port, the deformable sleeve being radially inwardly deformable responsive to an axial compressive force; and
a thrust ring disposed adjacent the chamber connection port, the thrust ring defining a radially inner surface having opposing inner post groove followers arranged to engage the helical grooves of the compression cylinder, the thrust ring being rotationally engagable with the compression cylinder so that relative rotation between the compression cylinder and the thrust ring causes the groove followers to move along the helical grooves thereby urging the compression cylinder axially toward the system pipe connection port to compress the deformable sleeve, wherein
the thrust ring is rotationally movable about the locking assembly axis from a first unlocked non-compressing position where the deformable sleeve is in its non-deformed condition, to a second locked compressing position where the deformable sleeve is axially compressed to cause deformation with its walls collapsing radially inward to form a seal around a retractable hose disposed through the locking assembly, wherein the locking assembly axis is inclined to the plane defined by the planar exterior face plate.

5. A hose valve as recited in claim 4 wherein the compression cylinder further comprises:
a radially outer o-ring groove arranged to receive an o-ring to establish and maintain a seal between the compression cylinder and the cylindrical interior surface of the system pipe connection port, and
a radially inner o-ring groove arranged to receive an o-ring to establish and maintain a seal between the compression cylinder and a cylindrical sealing lip defined by the chamber connection port.

6. A hose valve as recited in claim 5 wherein the face plate is formed to define a planar mounting flange for securing the valve box to a fixed structure.

7. A hose valve as recited in claim 6 wherein the thrust ring comprises a locking arm that extends through the locking arm opening of the exterior face plate.

8. A hose valve for central vacuum cleaning systems having retractable suction hoses that retract into a system vacuum pipe, the hose valve comprising:
a valve box formed to define a nozzle storage chamber, and a planar exterior face plate having a hose receiving aperture arranged for sealed communication with the nozzle storage chamber, the exterior face plate further comprising a locking arm opening disposed in spaced relation to the hose receiving aperture;
a chamber connection port arranged and disposed for sealed communication with the nozzle storage chamber, the chamber connection port having an interior cylindrical sealing lip;
a system pipe connection port arranged to securely engage the chamber connection port, the system pipe connection port defining a cylindrical interior surface and an upper sleeve seat defined by an interior portion of the system pipe connection port;
a locking assembly radially disposed about a locking assembly axis, wherein the locking assembly is disposed between the chamber connection port and the system pipe connection port, the locking assembly defining a passage for receiving and guiding a retractable hose that is extendable through the locking assembly, into and through the nozzle storage chamber, and through the hose receiving aperture of the planar mounting flange, the locking assembly comprising:
a coaxially disposed compression cylinder having a radially disposed interior sleeve seat and a radially outer cylinder surface arranged to define symmetrically disposed helical grooves;
a cylindrical deformable sleeve coaxially disposed adjacent the compression cylinder, the deformable sleeve having a compression end arranged to engage the interior sleeve seat of the compression cylinder, and a flange end formed to engage the upper sleeve seat of the system pipe connection port, the deformable sleeve being radially inwardly deformable responsive to an axial compressive force; and
a thrust ring disposed adjacent the chamber connection port, the thrust ring defining a radially inner surface having opposing inner post groove followers arranged to engage the helical grooves of the compression cylinder, the thrust ring being rotationally engagable with the compression cylinder so that relative rotation between the compression cylinder and the thrust ring causes the groove followers to move along the helical grooves thereby urging the compression cylinder axially toward the system pipe connection port to compress the deformable sleeve, wherein
the thrust ring is rotationally movable about the locking assembly axis from a first unlocked non-compressing position where the deformable sleeve is in its non-deformed condition, to a second locked compressing position where the deformable sleeve is axially compressed to cause deformation with its walls collapsing radially inward to form a seal around a retractable hose disposed through the locking assembly;
wherein the hose valve further comprises a sealing door attached to the exterior face plate, the sealing door being movable from a first open position to a second closed position adjacent the exterior face plate, the sealing door having an interior surface configured to receive and secure a flexible seal shaped to seal the hose receiving aperture when the door is in the second closed position; and
wherein the system pipe connection port further comprises an arcuate transition pipe having a fixed end coaxially disposed about the locking assembly axis, extending to a connecting end axially disposed about a vacuum pipe axis that extends substantially parallel to the plane defined by the planar mounting flange of the exterior face plate, wherein the transition pipe is in sealed communication with the vacuum pipe.

9. A hose valve for central vacuum cleaning systems having retractable suction hoses that retract into a system vacuum pipe, the hose valve comprising:
a valve box formed to define a nozzle storage chamber, and a planar exterior face plate having a hose receiving aperture arranged for sealed communication with the nozzle storage chamber, the exterior face plate further comprising a locking arm opening disposed in spaced relation to the hose receiving aperture;

a chamber connection port arranged and disposed for sealed communication with the nozzle storage chamber, the chamber connection port having an interior cylindrical sealing lip;

a system pipe connection port arranged to securely engage the chamber connection port, the system pipe connection port defining a cylindrical interior surface and an upper sleeve seat defined by an interior portion of the system pipe connection port;

a locking assembly radially disposed about a locking assembly axis, wherein the locking assembly is disposed between the chamber connection port and the system pipe connection port, the locking assembly defining a passage for receiving and guiding a retractable hose that is extendable through the locking assembly, into and through the nozzle storage chamber, and through the hose receiving aperture of the planar mounting flange, the locking assembly comprising:

a coaxially disposed compression cylinder having a radially disposed interior sleeve seat and a radially outer cylinder surface arranged to define symmetrically disposed helical grooves;

a cylindrical deformable sleeve coaxially disposed adjacent the compression cylinder, the deformable sleeve having a compression end arranged to engage the interior sleeve seat of the compression cylinder, and a flange end formed to engage the upper sleeve seat of the system pipe connection port, the deformable sleeve being radially inwardly deformable responsive to an axial compressive force; and a thrust ring disposed adjacent the chamber connection port, the thrust ring defining a radially inner surface having opposing inner post groove followers arranged to engage the helical grooves of the compression cylinder, the thrust ring being rotationally engagable with the compression cylinder so that relative rotation between the compression cylinder and the thrust ring causes the groove followers to move along the helical grooves thereby urging the compression cylinder axially toward the system pipe connection port to compress the deformable sleeve, wherein the thrust ring is rotationally movable about the locking assembly axis from a first unlocked non-compressing position where the deformable sleeve is in its non-deformed condition, to a second locked compressing position where the deformable sleeve is axially compressed to cause deformation with its walls collapsing radially inward to form a seal around a retractable hose disposed through the locking assembly, wherein the system pipe connection port further comprises an arcuate transition pipe having a fixed end coaxially disposed about the locking assembly axis, extending to a connecting end axially disposed about a vacuum pipe axis that extends substantially parallel to the plane defined by the planar mounting flange of the exterior face plate cover, wherein the transition pipe is in sealed communication with the vacuum pipe.

10. A hose valve for central vacuum cleaning systems having retractable suction hoses that retract into a system vacuum pipe, the hose valve comprising:

a valve box formed to define a nozzle storage chamber, and a planar exterior face plate having a hose receiving aperture arranged for sealed communication with the nozzle storage chamber, the exterior face plate further comprising a locking arm opening disposed in spaced relation to the hose receiving aperture;

a chamber connection port arranged and disposed for sealed communication with the nozzle storage chamber, the chamber connection port having an interior cylindrical sealing lip;

a system pipe connection port arranged to securely engage the chamber connection port, the system pipe connection port defining a cylindrical interior surface and an upper sleeve seat defined by an interior portion of the system pipe connection port;

a locking assembly radially disposed about a locking assembly axis, wherein the locking assembly is disposed between the chamber connection port and the system pipe connection port, the locking assembly defining a passage for receiving and guiding a retractable hose that is extendable through the locking assembly, into and through the nozzle storage chamber, and through the hose receiving aperture of the planar mounting flange, the locking assembly comprising:

a coaxially disposed compression cylinder having a radially disposed interior sleeve seat and a radially outer cylinder surface arranged to define symmetrically disposed helical grooves;

a cylindrical deformable sleeve coaxially disposed adjacent the compression cylinder, the deformable sleeve having a compression end arranged to engage the interior sleeve seat of the compression cylinder, and a flange end formed to engage the upper sleeve seat of the system pipe connection port, the deformable sleeve being radially inwardly deformable responsive to an axial compressive force; and a thrust ring disposed adjacent the chamber connection port, the thrust ring defining a radially inner surface having opposing inner post groove followers arranged to engage the helical grooves of the compression cylinder, the thrust ring being rotationally engagable with the compression cylinder so that relative rotation between the compression cylinder and the thrust ring causes the groove followers to move along the helical grooves thereby urging the compression cylinder axially toward the system pipe connection port to compress the deformable sleeve, wherein the thrust ring is rotationally movable about the locking assembly axis from a first unlocked non-compressing position where the deformable sleeve is in its non-deformed condition, to a second locked compressing position where the deformable sleeve is axially compressed to cause deformation with its walls collapsing radially inward to form a seal around a retractable hose disposed through the locking assembly, wherein the compression cylinder further comprises:

a radially outer o-ring groove arranged to receive an o-ring to establish and maintain a seal between the compression cylinder and the cylindrical interior surface of the system pipe connection port, and a radially inner o-ring groove arranged to receive an o-ring to establish and maintain a seal between the compression cylinder and a cylindrical sealing lip defined by the chamber connection port.

11. A method for making hose valve for central vacuum cleaning systems having retractable suction hoses that retract into a system vacuum pipe, the method comprising the steps:

forming a valve box to define a nozzle storage chamber, and a planar exterior face plate having a hose receiving aperture arranged for sealed communication with the nozzle storage chamber, the exterior face plate further comprising a locking arm opening disposed in spaced relation to the hose receiving aperture;

forming a chamber connection port arranged and disposed for sealed communication with the nozzle storage chamber, the chamber connection port having an interior cylindrical sealing lip;

securely connecting a system pipe connection port to the chamber connection port, the system pipe connection port defining a cylindrical interior surface and an upper sleeve seat defined by an interior portion of the system pipe connection port;

coaxially arranging a locking assembly about a locking assembly axis, wherein the locking assembly is disposed between the chamber connection port and the system pipe connection port, the locking assembly defining a passage for receiving and guiding a retractable hose that is extendable through the locking assembly, into and through the nozzle storage chamber, and through the hose receiving aperture of the planar mounting flange, the locking assembly comprising:

a coaxially disposed compression cylinder having a radially disposed interior sleeve seat and a radially outer cylinder surface arranged to define symmetrically disposed helical grooves;

a cylindrical deformable sleeve coaxially disposed adjacent the compression cylinder, the deformable sleeve having a compression end arranged to engage the interior sleeve seat of the compression cylinder, and a flange end formed to engage the upper sleeve seat of the system pipe connection port, the deformable sleeve being radially inwardly deformable responsive to an axial compressive force; and a thrust ring disposed adjacent the chamber connection port, the thrust ring defining a radially inner surface having opposing inner post groove followers arranged to engage the helical grooves of the compression cylinder, the thrust ring being rotationally engagable with the compression cylinder so that relative rotation between the compression cylinder and the thrust ring causes the groove followers to move along the helical grooves thereby urging the compression cylinder axially toward the system pipe connection port to compress the deformable sleeve, wherein the thrust ring is rotationally movable about the locking assembly axis from a first unlocked non-compressing position where the deformable sleeve is in its non-deformed condition, to a second locked compressing position where the deformable sleeve is axially compressed to cause deformation with its walls collapsing radially inward to form a seal around a retractable hose disposed through the locking assembly.

12. A method for making a hose valve as recited in claim 11 wherein the thrust ring comprises a locking arm that extends through the locking arm opening of the exterior face plate.

13. A method for making a hose valve as recited in claim 11 further comprising a sealing door attached to the exterior face plate, the sealing door being movable from a first open position to a second closed position adjacent the exterior face plate, the sealing door having an interior surface configured to receive and secure a flexible seal shaped to seal the hose receiving aperture when the door is in the second closed position.

14. A method for making hose valve for central vacuum cleaning systems having retractable suction hoses that retract into a system vacuum pipe, the method comprising the steps:

forming a valve box to define a nozzle storage chamber, and a planar exterior face plate having a hose receiving aperture arranged for sealed communication with the nozzle storage chamber, the exterior face plate further comprising a locking arm opening disposed in spaced relation to the hose receiving aperture;

forming a chamber connection port arranged and disposed for sealed communication with the nozzle storage chamber, the chamber connection port having an interior cylindrical sealing lip;

securely connecting a system pipe connection port to the chamber connection port, the system pipe connection port defining a cylindrical interior surface and an upper sleeve seat defined by an interior portion of the system pipe connection port;

coaxially arranging a locking assembly about a locking assembly axis, wherein the locking assembly is disposed between the chamber connection port and the system pipe connection port, the locking assembly defining a passage for receiving and guiding a retractable hose that is extendable through the locking assembly, into and through the nozzle storage chamber, and through the hose receiving aperture of the planar mounting flange, the locking assembly comprising:

a coaxially disposed compression cylinder having a radially disposed interior sleeve seat and a radially outer cylinder surface arranged to define symmetrically disposed helical grooves;

a cylindrical deformable sleeve coaxially disposed adjacent the compression cylinder, the deformable sleeve having a compression end arranged to engage the interior sleeve seat of the compression cylinder, and a flange end formed to engage the upper sleeve seat of the system pipe connection port, the deformable sleeve being radially inwardly deformable responsive to an axial compressive force; and a thrust ring disposed adjacent the chamber connection port, the thrust ring defining a radially inner surface having opposing inner post groove followers arranged to engage the helical grooves of the compression cylinder, the thrust ring being rotationally engagable with the compression cylinder so that relative rotation between the compression cylinder and the thrust ring causes the groove followers to move along the helical grooves thereby urging the compression cylinder axially toward the system pipe connection port to compress the deformable sleeve, wherein the thrust ring is rotationally movable about the locking assembly axis from a first unlocked non-compressing position where the deformable sleeve is in its non-deformed condition, to a second locked compressing position where the deformable sleeve is axially compressed to cause deformation with its walls collapsing radially inward to form a seal around a retractable hose disposed through the locking assembly;

wherein the locking assembly axis is inclined to the plane defined by the planar mounting flange of the exterior face plate.

15. A method for making hose valve for central vacuum cleaning systems having retractable suction hoses that retract into a system vacuum pipe, the method comprising the steps:

forming a valve box to define a nozzle storage chamber, and a planar exterior face plate having a hose receiving aperture arranged for sealed communication with the nozzle storage chamber, the exterior face plate further comprising a locking arm opening disposed in spaced relation to the hose receiving aperture;
forming a chamber connection port arranged and disposed for sealed communication with the nozzle storage chamber, the chamber connection port having an interior cylindrical sealing lip;
securely connecting a system pipe connection port to the chamber connection port, the system pipe connection port defining a cylindrical interior surface and an upper sleeve seat defined by an interior portion of the system pipe connection port;
coaxially arranging a locking assembly about a locking assembly axis, wherein the locking assembly is disposed between the chamber connection port and the system pipe connection port, the locking assembly defining a passage for receiving and guiding a retractable hose that is extendable through the locking assembly, into and through the nozzle storage chamber, and through the hose receiving aperture of the planar mounting flange, the locking assembly comprising:
a coaxially disposed compression cylinder having a radially disposed interior sleeve seat and a radially outer cylinder surface arranged to define symmetrically disposed helical grooves;
a cylindrical deformable sleeve coaxially disposed adjacent the compression cylinder, the deformable sleeve having a compression end arranged to engage the interior sleeve seat of the compression cylinder, and a flange end formed to engage the upper sleeve seat of the system pipe connection port, the deformable sleeve being radially inwardly deformable responsive to an axial compressive force; and
a thrust ring disposed adjacent the chamber connection port, the thrust ring defining a radially inner surface having opposing inner post groove followers arranged to engage the helical grooves of the compression cylinder, the thrust ring being rotationally engagable with the compression cylinder so that relative rotation between the compression cylinder and the thrust ring causes the groove followers to move along the helical grooves thereby urging the compression cylinder axially toward the system pipe connection port to compress the deformable sleeve, wherein the thrust ring is rotationally movable about the locking assembly axis from a first unlocked non-compressing position where the deformable sleeve is in its non-deformed condition, to a second locked compressing position where the deformable sleeve is axially compressed to cause deformation with its walls collapsing radially inward to form a seal around a retractable hose disposed through the locking assembly;
wherein the compression cylinder further comprises:
a radially outer o-ring groove arranged to receive an o-ring to establish and maintain a seal between the compression cylinder and the cylindrical interior surface of the system pipe connection port, and
a radially inner o-ring groove arranged to receive an o-ring to establish and maintain a seal between the compression cylinder and a cylindrical sealing lip defined by the chamber connection port.

16. A method for making hose valve for central vacuum cleaning systems having retractable suction hoses that retract into a system vacuum pipe, the method comprising the steps:
forming a valve box to define a nozzle storage chamber, and a planar exterior face plate having a hose receiving aperture arranged for sealed communication with the nozzle storage chamber, the exterior face plate further comprising a locking arm opening disposed in spaced relation to the hose receiving aperture;
forming a chamber connection port arranged and disposed for sealed communication with the nozzle storage chamber, the chamber connection port having an interior cylindrical sealing lip;
securely connecting a system pipe connection port to the chamber connection port, the system pipe connection port defining a cylindrical interior surface and an upper sleeve seat defined by an interior portion of the system pipe connection port;
coaxially arranging a locking assembly about a locking assembly axis, wherein the locking assembly is disposed between the chamber connection port and the system pipe connection port, the locking assembly defining a passage for receiving and guiding a retractable hose that is extendable through the locking assembly, into and through the nozzle storage chamber, and through the hose receiving aperture of the planar mounting flange, the locking assembly comprising:
a coaxially disposed compression cylinder having a radially disposed interior sleeve seat and a radially outer cylinder surface arranged to define symmetrically disposed helical grooves;
a cylindrical deformable sleeve coaxially disposed adjacent the compression cylinder, the deformable sleeve having a compression end arranged to engage the interior sleeve seat of the compression cylinder, and a flange end formed to engage the upper sleeve seat of the system pipe connection port, the deformable sleeve being radially inwardly deformable responsive to an axial compressive force; and
a thrust ring disposed adjacent the chamber connection port, the thrust ring defining a radially inner surface having opposing inner post groove followers arranged to engage the helical grooves of the compression cylinder, the thrust ring being rotationally engagable with the compression cylinder so that relative rotation between the compression cylinder and the thrust ring causes the groove followers to move along the helical grooves thereby urging the compression cylinder axially toward the system pipe connection port to compress the deformable sleeve, wherein the thrust ring is rotationally movable about the locking assembly axis from a first unlocked non-compressing position where the deformable sleeve is in its non-deformed condition, to a second locked compressing position where the deformable sleeve is axially compressed to cause deformation with its walls collapsing radially inward to form a seal around a retractable hose disposed through the locking assembly;
wherein the system pipe connection port further comprises an arcuate transition pipe having a fixed end coaxially disposed about the locking assembly axis, extending to a connecting end axially disposed about a vacuum pipe axis that extends substantially parallel to the plane defined by the planar mounting flange of the exterior face plate cover, wherein the transition pipe is in sealed communication with the vacuum pipe.

17. A hose valve for central vacuum cleaning systems having retractable suction hoses that retract into a system vacuum pipe, the hose valve comprising:
a valve box formed to define a nozzle storage chamber, and a planar exterior face plate having a hose receiving aperture arranged for sealed communication with the nozzle storage chamber, the exterior face plate further comprising a locking arm opening disposed in spaced relation to the hose receiving aperture;

a chamber connection port arranged and disposed for sealed communication with the nozzle storage chamber, the chamber connection port having an interior cylindrical sealing lip;

a system pipe connection port arranged to securely engage the chamber connection port, the system pipe connection port defining a cylindrical interior surface and an upper sleeve seat defined by an interior portion of the system pipe connection port;

a locking assembly radially disposed about a locking assembly axis, wherein the locking assembly axis is inclined to the plane defined by the exterior face plate, wherein the locking assembly is disposed between the chamber connection port and the system pipe connection port, the locking assembly defining a passage for receiving and guiding a retractable hose that is extendable through the locking assembly, into and through the nozzle storage chamber, and through the hose receiving aperture of the planar mounting flange, the locking assembly comprising:

a coaxially disposed compression cylinder having a radially disposed interior sleeve seat and a radially outer cylinder surface arranged to define symmetrically disposed helical grooves;

a cylindrical deformable sleeve coaxially disposed adjacent the compression cylinder, the deformable sleeve having a compression end arranged to engage the interior sleeve seat of the compression cylinder, and a flange end formed to engage the upper sleeve seat of the system pipe connection port, the deformable sleeve being radially inwardly deformable responsive to an axial compressive force; and a thrust ring disposed adjacent the chamber connection port, wherein the thrust ring comprises a locking arm that extends through the locking arm opening of the exterior face plate, the thrust ring defining a radially inner surface having opposing inner post groove followers arranged to engage the helical grooves of the compression cylinder, the thrust ring being rotationally engagable with the compression cylinder so that relative rotation between the compression cylinder and the thrust ring causes the groove followers to move along the helical grooves thereby urging the compression cylinder axially toward the system pipe connection port to compress the deformable sleeve, wherein the thrust ring is rotationally movable about the locking assembly axis from a first unlocked non-compressing position, where the locking arm is in a first position, and where the deformable sleeve is in its non-deformed condition, to a second locked compressing position, where the locking arm is in a second position, and where the deformable sleeve is axially compressed to cause deformation with its walls collapsing radially inward to form a seal around a retractable hose disposed through the locking assembly.

18. A hose valve as recited in claim 17 wherein the compression cylinder further comprises:
   a radially outer o-ring groove arranged to receive an o-ring to establish and maintain a seal between the compression cylinder and the cylindrical interior surface of the system pipe connection port, and
   a radially inner o-ring groove arranged to receive an o-ring to establish and maintain a seal between the compression cylinder and a cylindrical sealing lip defined by the chamber connection port.

19. A hose valve as recited in claim 18 further comprising a sealing door attached to the exterior face plate, the sealing door being movable from a first open position to a second closed position adjacent the exterior face plate, the sealing door having an interior surface configured to receive and secure a flexible seal shaped to seal the hose receiving aperture when the door is in the second closed position.

20. A hose valve as recited in claim 19 wherein the face plate is formed to define a planar mounting flange for securing the valve box to a fixed structure.

* * * * *